United States Patent

[11] 3,593,581

| [72] | Inventor | Leroy E. Beightol<br>Los Angeles, Calif. |
|---|---|---|
| [21] | Appl. No. | 790,307 |
| [22] | Filed | Jan. 10, 1969 |
| [45] | Patented | July 20, 1971 |
| [73] | Assignee | Solar Laboratories, Inc.<br>Torrance, Calif. |

[54] ELECTRICAL THERMOMETER
6 Claims, 5 Drawing Figs.

[52] U.S. Cl. .................................................... 73/362,
338/28
[51] Int. Cl. ......................................... G01k 7/16
[50] Field of Search .................................... 73/362 R;
338/25, 28, 30; 323/75 N

[56] References Cited
UNITED STATES PATENTS

| 2,337,202 | 12/1943 | Jones | 338/30 |
|---|---|---|---|
| 2,753,714 | 7/1956 | Perkins et al. | 73/362 (R) |
| 3,153,769 | 10/1964 | Moses | 73/362 (R) X |
| 3,377,862 | 4/1968 | Gheorghin | 73/362 (R) |
| 3,379,063 | 4/1968 | Schonberger | 73/362 (R) |
| 3,402,378 | 9/1968 | Catlin et al. | 73/362 (R) X |
| 2,971,379 | 2/1961 | Weisheit | 73/362 (R) |

*Primary Examiner*—Louis R. Prince
*Assistant Examiner*—Frederick Shoon
*Attorney*—Finkelstein & Mueth

ABSTRACT: This patent describes an electrical thermometer device comprising an electrical circuit containing a disposable resistance element which is adapted to be inserted into an opening of the human body and which resistor undergoes changes in resistance as a result of a change in temperature produced therein by the human body.

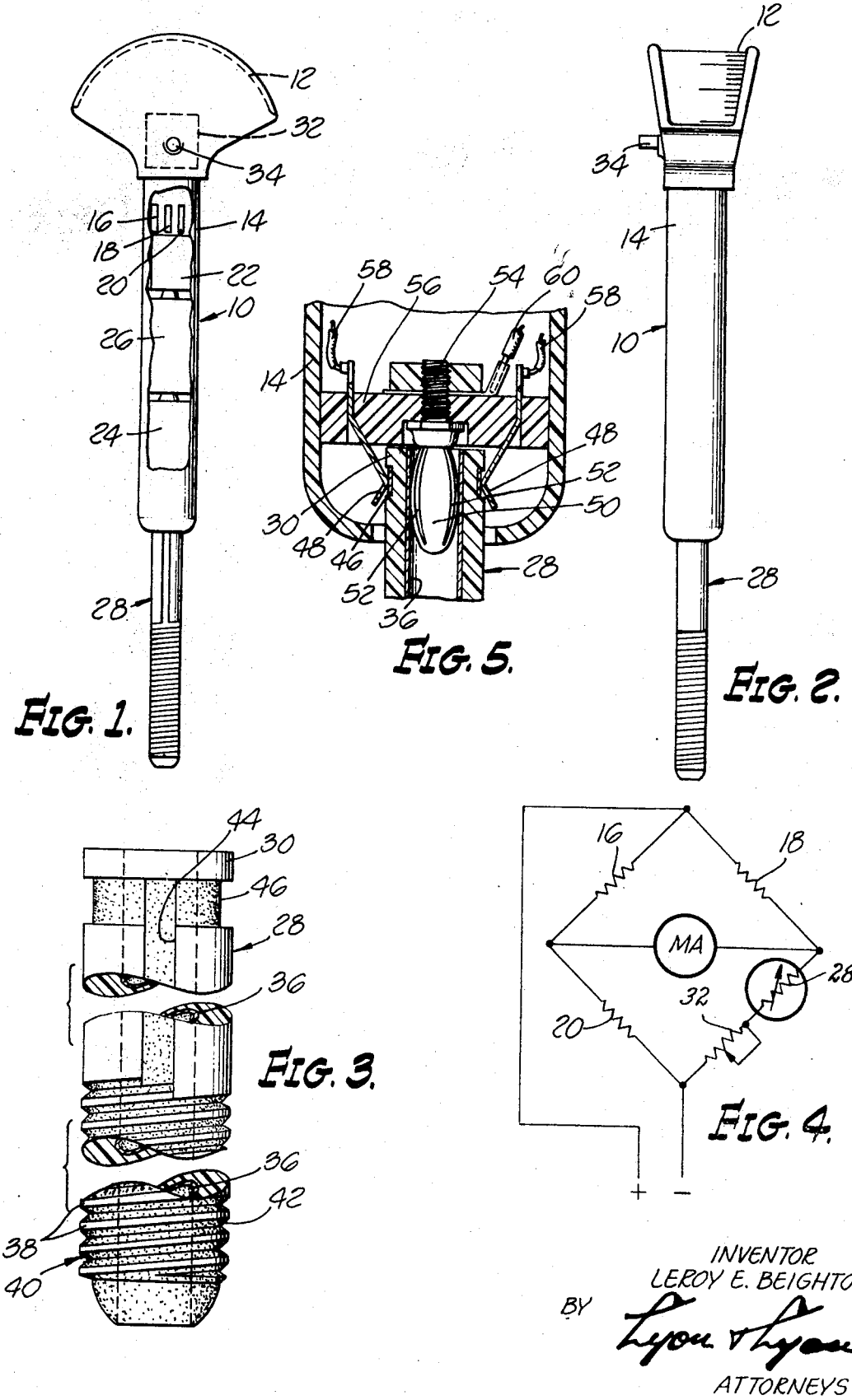

1

ELECTRICAL THERMOMETER

BACKGROUND OF THE INVENTION

Various devices have been proposed for the measuring of the temperature of the human body. The most commonly used device is the mercury thermometer which requires several minutes between insertion and the time at which it is possible to obtain an accurate reading of body temperature on the thermometer. This timelag normally requires that the nurse or other attendant make several trips to each patient for each temperature reading. Sine it is normal practice to take the temperature of every patient in the hospital at least several times a day, the amount of added labor required because of the timelag inherent in the use of the mercury thermometer is considerable. In addition, the mercury thermometer is characterized by several other disadvantages including its relatively high cost and fragility which results in a short average life. Many other problems are associated with the use of mercury thermometers and are familiar to those skilled in the art. The present invention is directed to a device which is a substantial improvement over the mercury thermometer. More specifically, the device of the present invention is a major improvement in the following principal respect, namely, it permits the insertion of the temperature-sensing device in the human body whereupon an almost instantaneous accurate readout of body temperature is provided thereby eliminating the need for a return trip by the nurse or hospital attendant to read the temperature. The device of the present invention will substantially reduce the labor in the hospital. In addition, the device of the present invention is adapted to be constructed in a way such that it is not readily damaged or broken and, hence, does not require continuous replacement. Another advantage of the present invention is that the element coming in contact with the patient is disposable which lessens the possibility of the transmission of bacteria from one patient to another. The device of the present invention is also a self-contained unit and is easily carried by the attendant on his person.

SUMMARY OF THE INVENTION

Briefly, the present invention comprises an electrical thermometer device comprising an electrical circuit containing a disposable resistance element which is adapted to be inserted into an opening of the human body and which resistor undergoes changes in resistance as a result of a change in temperature. More particularly, the present invention comprises an electrical thermometer device comprising a wheatstone bridge circuit comprising a power source, a disposable resistance element adapted to be inserted in an opening of the human body which resistor is adapted to change resistance as a result of change in temperature, and means for establishing electrical balance in said circuit whereby said change in resistance indicates the human body temperature.

In the preferred embodiment of my invention, the thermometer device comprises a body member, received in said body member a power source, electrically connected to said power source an electrical bridge circuit comprising a plurality of resistors at least one of which is manually adjustable, another of said resistors being temperature sensitive within the usual range of human body temperature and disposed on said body member so as to be adapted to be inserted in an opening of the human body, and an ammeter across said bridge circuit, said ammeter having a visual readout portion calibrated in degrees to indicate human body temperature.

It is an object of the present invention to provide a novel electrical thermometer.

More specifically it is an object of the present invention to provide a thermometer in which a resistance element is inserted in the mouth or anus which is sensitive to temperature change. This change in resistance is read on a meter to thereby indicate the body temperature with the aid of an electrical bridge.

These and other objects and advantages of the present invention will be apparent from the more detailed description which follows.

DESCRIPTION OF PREFERRED EMBODIMENTS

Turning to the drawings:

FIG. 1 shows a front view with parts broken away of one embodiment of the present invention:

FIG. 2 shows a side view of the device shown in FIG. 1;

FIG. 3 is an enlarged view of one form of temperature-sensitive resistor element adapted for use in the present invention;

FIG. 4 is a schematic diagram of the electrical circuitry involved in the preferred embodiment of the present invention; and FIG. 5 is an enlarged sectional view of the preferred form of connection of the temperature-sensitive resistor element to the body of the device.

Turning to the drawings in greater detail, the casing of the device of the present invention is indicated generally as 10. The face or calibrated portion 12 of the device 10 is calibrated to indicate the body temperature normally in degrees F. The calibrated portion 12 is basically the readout of a milliamp meter, the construction of which is conventional, and is not shown in the drawings. The tubular body portion 14 contains three resistance elements 16, 18 and 20 which form parts of a wheatstone bridge. These resistive elements are connected by contact 22 to dry cell batteries 24 and 26. The member 28 is the temperature-sensitive resistive element adapted to be inserted in the mouth or anus. The end 30 of this element is connected to the electrical circuitry within the tubular member 14. The adjustable resistor 32 operated by knob 34 permits the balancing of the electrical bridge before insertion of the resistive element 28 in the body opening. The electrical circuitry of the device is known in the electrical arts as a trimming potentiometer.

The electrical circuitry in the tubular member is indicated schematically in FIG. 4 and is basically of a wheatstone bridge construction in which one arm of the bridge comprises the temperature-senstive resistance 28 inserted in the human body.

In use, the electrical bridge is first adjusted to the zero or balance point by adjustment of knob 34. The resistive element 28 is then inserted in the body opening. Almost instantaneously, the change in resistance due to body heat is read on calibrated portion 12. Normally, calibrated portion 12 expresses the resistance change in degrees F. The calibration of the device is a simple matter as will be apparent to those skilled in the art.

The temperature-sensitive resistive element 28 can be any resistor which undergoes a measurable change in resistance within the range of temperature encountered in the human body, viz, from about 94° F. to 106° F. Preferably, element 28 is made of a disposable material having a temperature-sensitive resistive metal coating. For example, a plastic part can be molded having the configuration shown in FIG. 3. The part is then coated inside and out with a thin coating 36 of a temperature-sensitive resistive metal. The coated part is then buffed to remove the metal coating from the lands 38 of threads 40. The metal remains in the grooves 42 of the threads, the depressed vertical portion 44, the depressed horizontal ring 46 and inside the element 28 to define an electrically conductive path. The element 28 is usually then coated with a thin flexible protective coating (not shown) to protect the metal from abrasion. The element 28 is best made of a plastic which is digested or softened by gastric juices so that in the event it is swallowed or a portion bit off, it can be passed through the intestinal tract.

The connection to the temperature-sensitive resistor is shown in one preferred way in FIG. 5. The resistor element 28 is held by conductive spring clips 48, and the plug conductor 50 provided with cutouts 52 to permit the plug to contract in diameter when the element 28 is forced over it. The clips 48 are biased in an inward direction toward conductor 50 so that when the element 28 is in place as shown, a good electrical connection is maintained by clips 48 on the ring 46. The plug conductor 50 is secured by threads 54 to crossmember 56. The clips 48 and conductor 50 are provided with leads 58 and 60, respectively, to permit the formation of the circuit arrangement of FIG. 4. The construction shown in FIG. 5 permits the easy insertion and removal of temperature-sensitive resistors. However, many other functionally equivalent arrangements will be evident to those skilled in the art, and are contemplated by my invention.

The calibrated portion 12 may be provided with a peak hand which travels with the temperature-indicating end as it moves up the scale but which remains at the "peak" temperature point after the temperature-indicating hand begins to down the scale. The use of such peak hands is familiar to those skilled in the art and need not be further described herein.

The device of the present invention possesses many advantages which will be apparent to those skilled in the art. For one thing, the entire device can be built in a simple self-contained unit by providing batteries or some other power source within the housing and in proximity to the electrical circuitry. The resistor elements are intended to be disposable thereby eliminating the need for any sterilization of parts between uses. Such resistive elements can be constructed in a very inexpensive form from plastic materials. This type of construction is more satisfactory in use because of the timesaving provided the nurse or attendant. It may be anticipated that this invention will find wide application in hospitals and doctors' offices.

Having fully defined the invention it is intended that it be limited only by the lawful scope of the appended claims.

I claim:

1. A temperature-sensing device adapted to determine the temperature of the human body comprising: an electrically conductive wheatstone bridge circuit having four resistive legs and two pairs of opposed terminals, three of said four resistive legs being fixed resistors; the fourth leg comprising, in series with each other, a resistor which is temperature sensitive within the usual range of human body temperature and which comprises a hollow tubular member having threads at one end, said member having a resistive coating which is temperature sensitive within the usual range of human body temperatures and wherein said coating has been removed from the lands of said threads, and a manually adjustable resistor; a power source for said bridge connected across one pair of opposed terminals of said bridge; and an ammeter across the other pair of opposed terminals of said bridge, said ammeter having a visual readout portion calibrated in degrees to indicate human body temperature.

2. A temperature-sensing device adapted to determine the temperature of the human body comprising: an electrically conductive wheatstone bridge circuit having four resistive legs and two pairs of opposed terminals, three of said four resistive legs being fixed resistors; the fourth leg comprising in series with each other a thermistor which is temperature sensitive within the usual range of human body temperature and which comprises a hollow tubular plastic member having external threads at one end, said member having a resistive metallic coating which is temperature sensitive within the usual range of human body temperatures and wherein said coating has been removed from the lands of said threads, and a manually adjustable resistor; a power source for said bridge connected across one pair of opposed terminals of said bridge; and an ammeter across the other pair of diagonally opposed terminals of said bridge, said ammeter having a visual readout portion calibrated in degrees to indicate human body temperature.

3. A temperature-sensing device adapted to determine the temperature of the human body comprising: an electrically conductive wheatstone bridge circuit having four resistive legs and two pairs of opposed terminals, three of said four resistive legs being fixed resistors; the fourth leg comprising in series with each other a resistor which is temperature sensitive within the usual range of human body temperature and which comprises a hollow tubular member having external threads at one end, said member having a resistive coating which is temperature sensitive within the usual range of human body temperatures and wherein said coating has been removed from the lands of said threads, and a manually adjustable resistor; a power source for said bridge connected across one pair of opposed terminals of said bridge; and comprising at least one battery; and an ammeter across the other pair of diagonally opposed terminals of said bridge, said ammeter having a visual readout portion calibrated in degrees to indicate human body temperature.

4. A self-contained temperature-sensing device used to determine the temperature of the human body comprising a body member, received in said body member a power source; an electrically conductive wheatstone bridge circuit having four resistive legs and two pairs of opposed terminals, three of said four resistive legs being fixed resistors; the fourth leg comprising in series with each other a manually adjustable resistor, and a resistor which is temperature sensitive within the usual range of human body temperature and which comprises a hollow tubular member having external threads at one end, said member having a resistive coating which is temperature sensitive within the usual range of human body temperatures and wherein said coating has been removed from the lands of said threads, said power source being connected across one pair of opposed terminals of said bridge; said temperature-sensitive resistor being disposed on said body member so as to be adapted to be inserted in an opening of the human body; and an ammeter across the other pair of diagonally opposed terminals of said bridge, said ammeter having a visual readout portion calibrated in degrees to indicate human body temperature.

5. The device of claim 4 wherein the power source comprises one or more dry cell batteries.

6. The device of claim 1 wherein said plastic member is made of a material capable of being passed through the intestinal tract.